United States Patent
Bashev et al.

(10) Patent No.: US 11,537,759 B2
(45) Date of Patent: Dec. 27, 2022

(54) METHOD AND SYSTEM FOR RETRIEVING A USER INTERFACE ON THE SCREEN OF AN ELECTRONIC DEVICE

(71) Applicant: LIMITED LIABILITY COMPANY "PEERF", Moscow (RU)

(72) Inventors: Vladimir Nikolaevich Bashev, Nizhnij Novgorod (RU); Nikolay Olegovich Ilyin, Moscow (RU)

(73) Assignee: LIMITED LIABILITY COMPANY "PEERF", Moscow (RU)

( * ) Notice: Subject to any disclaimer, the term of this patent is extended or adjusted under 35 U.S.C. 154(b) by 32 days.

(21) Appl. No.: 16/342,972

(22) PCT Filed: Aug. 1, 2017

(86) PCT No.: PCT/RU2017/050069
§ 371 (c)(1),
(2) Date: Apr. 18, 2019

(87) PCT Pub. No.: WO2018/080347
PCT Pub. Date: May 3, 2018

(65) Prior Publication Data
US 2020/0050801 A1    Feb. 13, 2020

(30) Foreign Application Priority Data
Oct. 28, 2016    (RU) ............................ RU2016142505

(51) Int. Cl.
*G06F 21/84*    (2013.01)
*G06F 3/0485*    (2022.01)
*G06F 3/04883*    (2022.01)

(52) U.S. Cl.
CPC ............ *G06F 21/84* (2013.01); *G06F 3/0485* (2013.01); *G06F 3/04883* (2013.01); *G06F 2221/2149* (2013.01)

(58) Field of Classification Search
CPC .... G06F 3/04883; G06F 3/0488; G06F 3/017; G06F 21/31; G06F 21/84; G06F 3/0485; G06F 2221/2149; G06F 3/04812; H04L 63/08; H04L 63/0861
See application file for complete search history.

(56) References Cited

U.S. PATENT DOCUMENTS

| | | | |
|---|---|---|---|
| 8,046,721 B2 | 10/2011 | Chaudhri et al. |
| 8,504,842 B1 | 8/2013 | Meacham |
| 9,032,337 B2 | 5/2015 | Oh et al. |

(Continued)

FOREIGN PATENT DOCUMENTS

CN    104951078 A    9/2015

*Primary Examiner* — Catherine Thiaw
*Assistant Examiner* — Andrew Suh
(74) *Attorney, Agent, or Firm* — Nixon & Vanderhye P.C.

(57) ABSTRACT

The claimed group of technical solutions relates to the field of controlling electronic devices with the aid of a graphical user interface, in particular to a method and a system for activating an interface with the aid of a specified type of user input. The technical result of the claimed solution consists in providing the option of activating a graphical user interface with the aid of a user input path from two different corner areas of a display. The claimed method is implemented by creating a pattern of gesture activation of an application, comprising an input path using corner regions of a screen.

18 Claims, 8 Drawing Sheets

(56) References Cited

U.S. PATENT DOCUMENTS

| | | | |
|---|---|---|---|
| 9,207,860 B2 | 12/2015 | Rydenhag et al. | |
| 9,875,017 B2* | 1/2018 | Nomachi | G06F 3/0233 |
| 10,175,864 B2* | 1/2019 | Missig | G06F 3/0481 |
| 2009/0289916 A1 | 11/2009 | Dai | |
| 2010/0257490 A1 | 10/2010 | Lyon et al. | |
| 2011/0088086 A1* | 4/2011 | Swink | G06F 21/36 |
| | | | 726/7 |
| 2013/0283144 A1* | 10/2013 | Roh | G06F 40/169 |
| | | | 715/230 |
| 2014/0306910 A1* | 10/2014 | Huang | G06F 3/04883 |
| | | | 345/173 |
| 2015/0116362 A1* | 4/2015 | Aurongzeb | G06F 1/1677 |
| | | | 345/650 |
| 2017/0192627 A1* | 7/2017 | Agnoli | G06F 3/04845 |
| 2018/0300051 A1* | 10/2018 | Kim | G06F 3/0416 |
| 2020/0348816 A1* | 11/2020 | Chaudhri | H04M 1/67 |

* cited by examiner

METHOD AND SYSTEM FOR RETRIEVING A USER INTERFACE ON THE SCREEN OF AN ELECTRONIC DEVICE

FIELD OF THE INVENTION

The claimed invention relates to the control of electronic devices by means of a graphical user interface, in particular, to the method and system for activating an application using a specified type of user input.

BACKGROUND OF THE INVENTION

From the existing level of technology, it is known a number of solutions aimed to activate certain applications on electronic devices.

U.S. Pat. No. 8,046,721 (Apple Inc., Oct. 25, 2011) reveals how to activate the graphical user interface when unlocking the phone using gesture input in a certain screen area.

There is a known solution (U.S. Pat. No. 9,207,860, BlackBerry Ltd., Dec. 8, 2015) to activate a mobile phone with a gesture when it is in a locked mode, or to lock it by defining a given gesture pattern.

There is also the solution (U.S. Pat. No. 9,032,337), which allows for activating different applications by assigning appropriate patterns for each type of applications and their subsequent recognition.

SUMMARY OF THE INVENTION

The disadvantages of the known solutions are an inability to assign a user input pattern path that would describe the least useful area of the display workspace while allowing the activation of the application or interface with a high degree of accuracy.

The technical result of the declared solution is a possibility to activate the graphical user interface or application using the user input path between two different corner areas of the display.

An additional result is an increase in access speed to the user application or graphical interface, due to the formation of gesture activation pattern using the corner areas of the display.

In one of the preferred options for the implementation of the claimed solution, the method for activating an application by a user on a screen of an electronic device is stated, containing the following stages:

forming a pattern of a gestural activation of an application on the device screen, wherein said pattern contains a gesture path that contains at least two contact areas on the screen, each of said areas is located in different corner areas of the screen;

saving in the device memory an information about said pattern;

defining a first area of contact on the screen of the device, wherein said first area of contact contains at least one area located near a corner of the screen;

determining a contact of the user with said first area of contact on the screen of the device;

determining an interaction of the user with the screen of the device, wherein said interaction is a movement from said first area of contact to a second area of contact, without an interruption of the user contact with the screen of the device during said movement, and wherein the second area of contact contains at least one area located near a corner of the screen, different from the first mentioned corner of the screen;

obtaining an information about the trajectory of said interaction of the user with the screen during movement from the first area of contact to the second area of contact;

comparing said information about the trajectory of the user interaction with said saved information about the pattern;

activating the application for the user when the information about the trajectory of the user interaction coincides with the saved information about the pattern.

In a particular embodiment, when comparing the trajectories, the errors of the deviation of the user gesture trajectory pattern from the stored pattern in the device memory are determined.

In another particular embodiment, the user interaction is carried out using a manipulator such as a mouse or touch screen, or touchpad.

When user interaction is carried out using only a touchpad of a device, the gestural pattern applied by the user on the touchpad could be translated to the screen of the device.

In another particular embodiment, when recognizing the fact of user interaction with the first area, a graphic element is formed.

In another particular embodiment, the transition path of the graphic element creates a pattern of the user gesture.

In another particular embodiment, the device is in a locked mode.

In another particular embodiment, if the patterns of gesture input are successfully compared, the devices are transferred from the locked mode to the unlocked mode.

Another preferred embodiment of the claimed invention is a system of calling the user interface or application on the screen of the electronic device is declared, comprising at least one processor;

at least one memory with machine-readable instructions, which, when executed by at least one processor, perform the method for activating an application by a user in the manner described above.

DETAILED DESCRIPTION OF THE INVENTION

Figure 1:
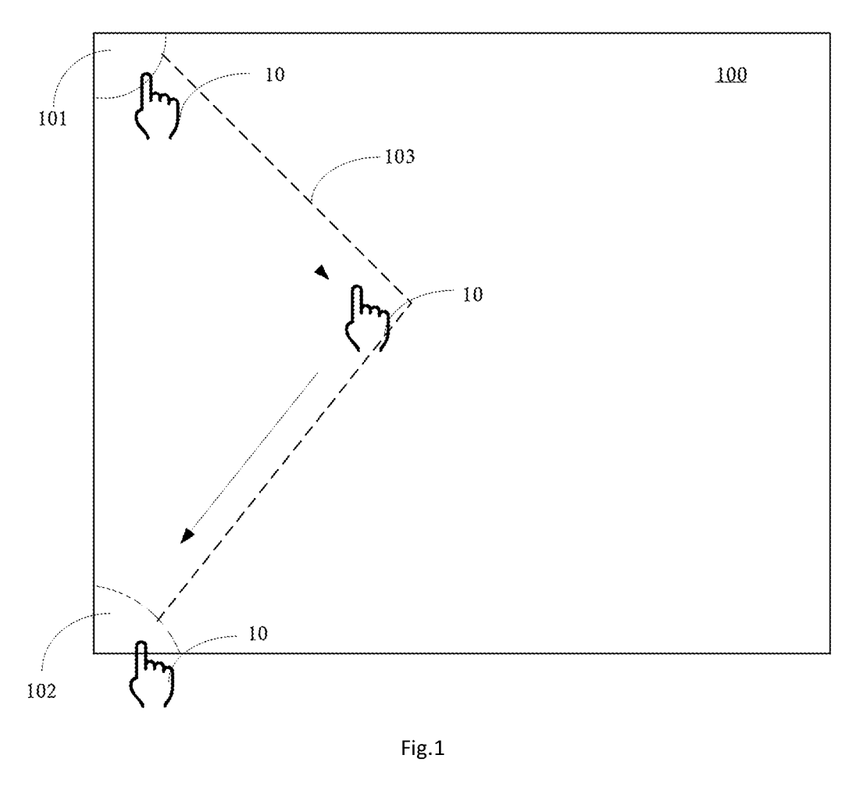
FIG. 1 illustrates an example of calling an interface using an angular path.

FIG. 1 shows the screen area (100) of the electronic device. The mentioned working area of the screen contains corner zones (101, 102) when interacting with which the user moves through the area of the screen (100). When recognizing the fact of interaction (10) with one or more points of the first corner area (101), signals characterizing the beginning of the user input are generated. When moving along a predetermined path (103) of the first angular region (101) in the second angular region (102), the software implementing a graphical user interface, forms a pattern of user input, which contains the trajectory of the user input device (10).

Figure 8:
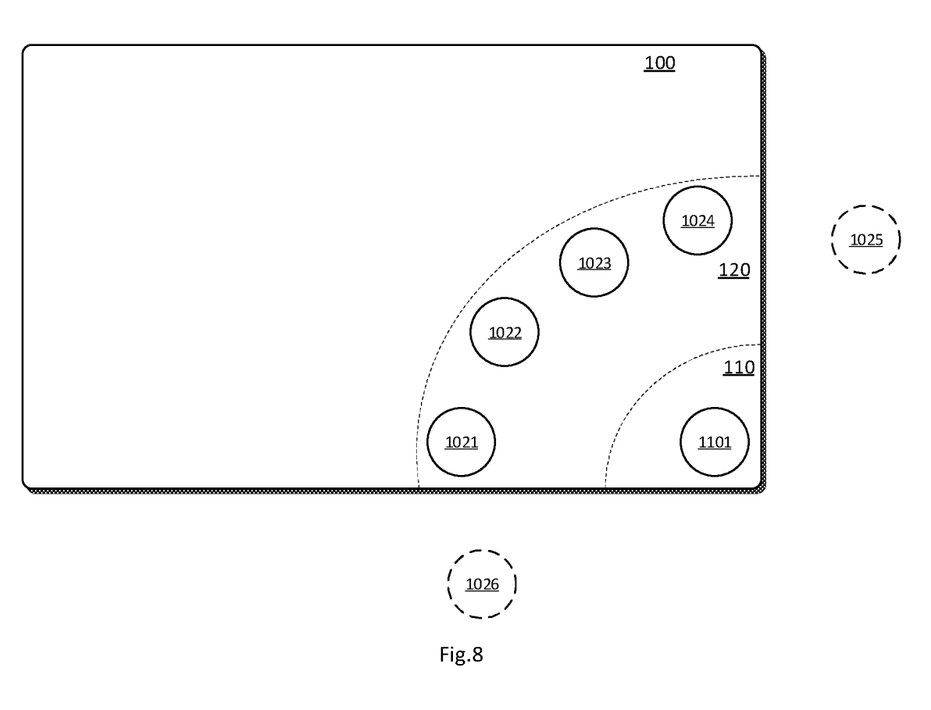
FIG. 8 illustrates an example of a radial user interface.

The obtained pattern of user input containing a pattern of the path (103) of the input is compared with stored beforehand in a device' memory pattern of activation of the application. If the saved pattern and the trajectory pattern (103) of the user input match, the associated application is activated, in particular, the radial user interface (FIG. 8).

Figure 2:
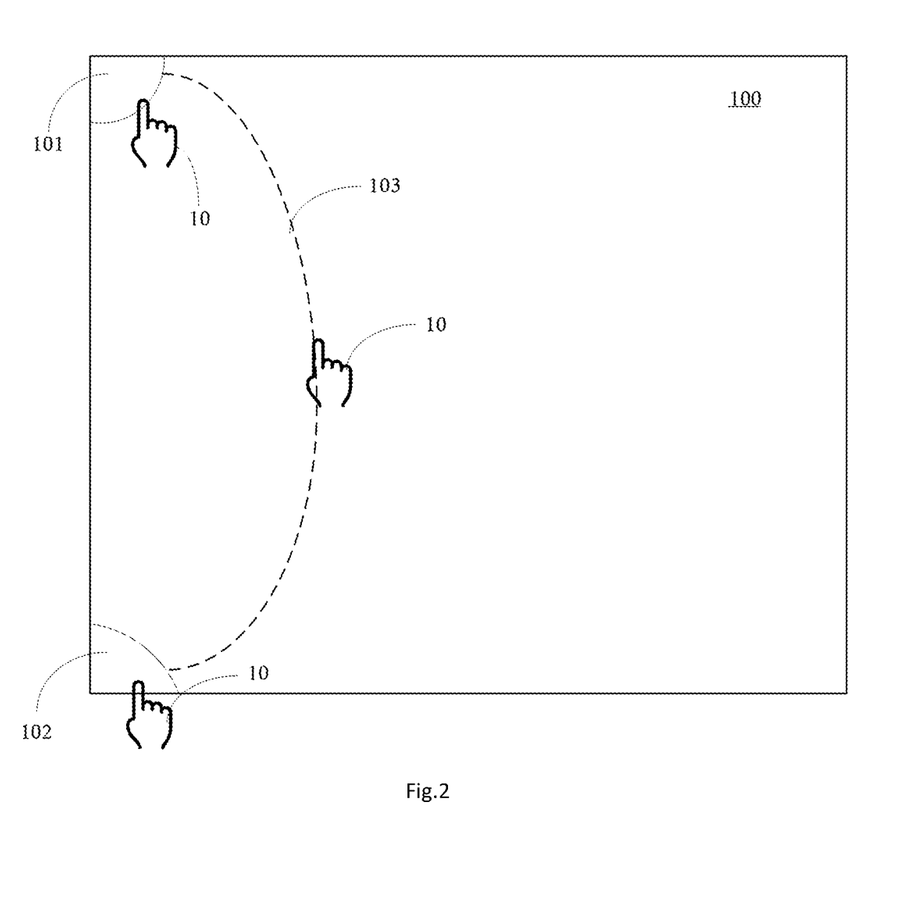
FIG. 2 illustrates an example of calling an interface along an arc path.

As presented in FIG. 1 user input is carried out from the first area (101) to the second area (102) along the angular trajectory (103). The shape of the trajectory (103) may be different, for example, arcuate (FIG. 2), or other type of drawing. The main requirement for the pattern is to move from one corner area to another without losing user interaction with the screen or graphical interface when forming a pattern.

User input (10) depends on the type of device (200, FIG. 4), with which the interaction is performed. If the device (200) is made with a touch display (208), the user interaction (10) will be a touch to the areas of the screen. The pattern in this case will be a gesture input (10) from the first area (101) to the second area (102). By performing gesture input without breaking contact with the touch screen (208), a user interaction pattern is formed, which is then compared with the pattern in the device' memory (200).

Figure 3:
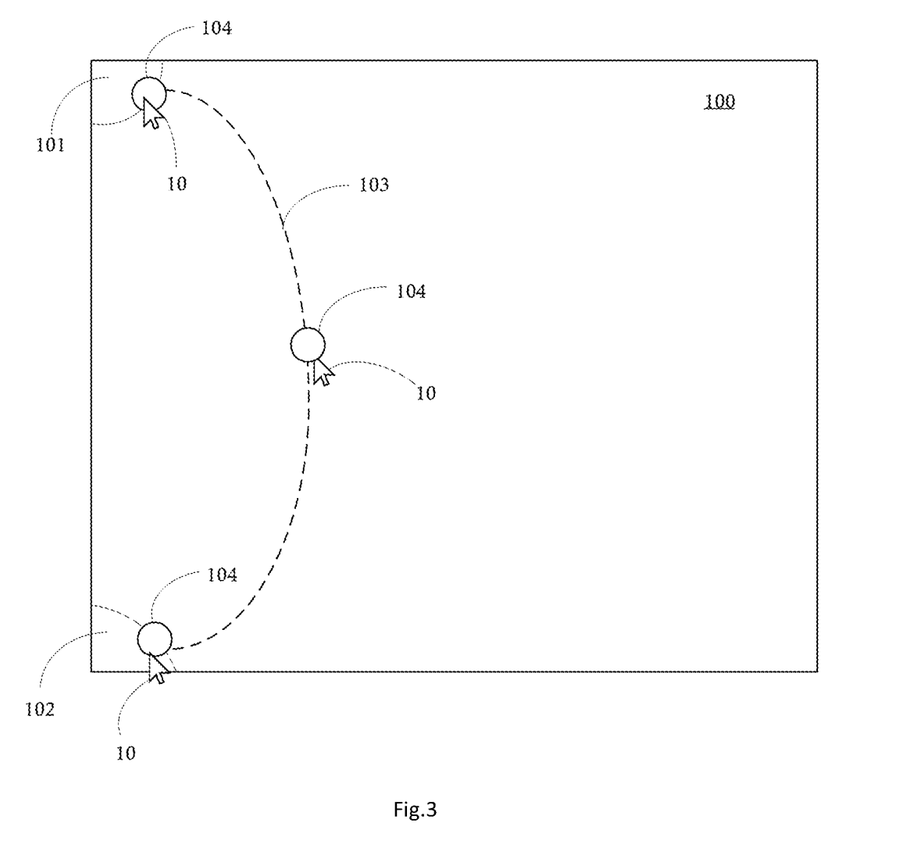
FIG. 3 illustrates an example of calling an interface along an arc path using an optional graphic.

If the device (200) is a personal computer, laptop, or other device that does not contain a touch screen (208), then, as shown in FIG. 3, in the area of interaction with the screen can be displayed additional graphic element (104), for example, made in the form of a circular additional area. The purpose of this element (104) is to indicate the fact of user interaction (10), which will help the user to complete the movement from one area (101) to another (102) to form a pattern for the execution of the required application.

Figure 4:
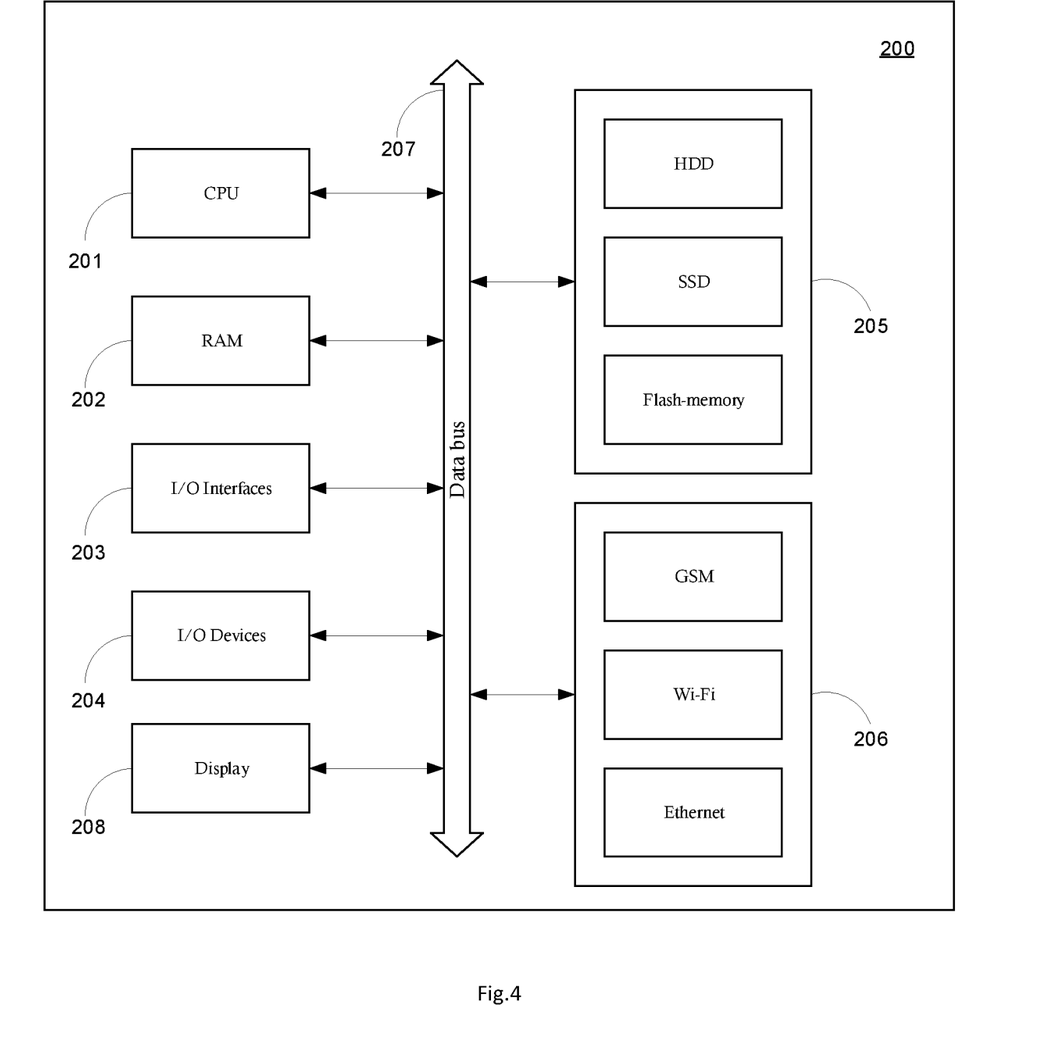
FIG. 4 illustrates an example of a computing device.

FIG. 4 presents a General diagram of the electronic device (200), which performs the claimed method of activation of the application. In General, the approximate implementation of a computing device (200) includes a common data bus (207): one or more processors/CPU (201), RAM (202), various I/O interfaces (203), I/O devices (204), one or more data storage facilities (205), one or more data transmission facilities (206).

I/O interfaces (203) can be selected from the group: USB, micro-USB, Lightning, USB-C, PS/2, LPT, COM, etc.

I/O devices (204) can be: joystick, mouse, keyboard, touch screen, display, monitor, projector, touchpad, trackball, light pen, speakers, etc.

Storage facilities (205) can be: HDD, SSD drives, Flash-memory (NAND, EEPROM, SD card), optical data drives (CD, DVD Rom, Blue-Ray disk).

As means of data transmission (206) can be used various devices and modules designed to provide wired or wireless connectivity and data transmission from one device (200) to another, in particular: Wi-Fi module, NFC module, Ethernet module, Bluetooth module, GSM module (2G, 3G, 4G, 5G), etc.

Figure 5:
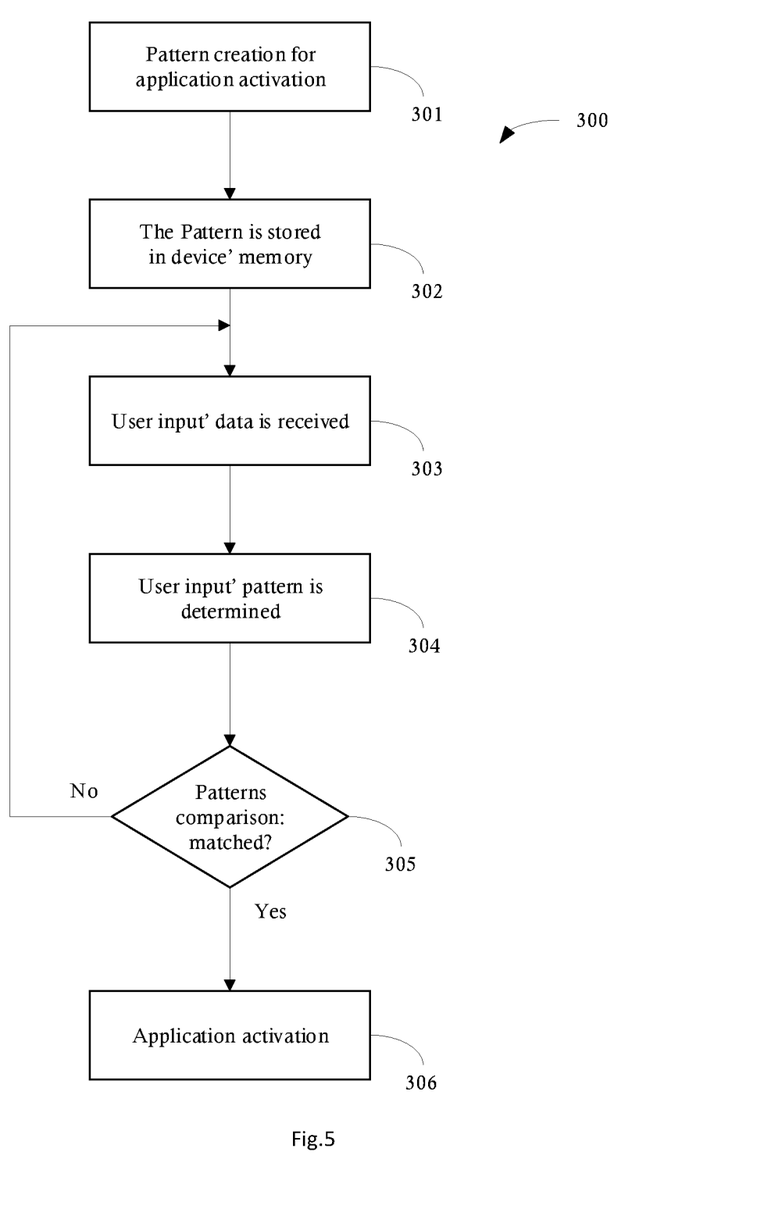
FIG. 5 illustrates the steps of how to call the interface in the unlocked mode of the device.

According to FIG. 5 to activate the application using user input, method (300) must be applied, that contains a specified sequence of steps. At the stage (301) a reference pattern is formed, which is stored in the memory (stage 302) of the device (200). The formation of the application activation pattern can be performed using the software stored in the device memory (200). The mentioned software can assign different types of patterns for different applications, types of user interface, etc.

In the next step (303), the device interface (200) recognizes the fact of user interaction (10) in the interface area (100), when moving along the path (103) from the first area (101) to the second (102), and receives data on the user input pattern (10) in the stage (304).

In step (305), the resulting user input pattern is compared with the pattern stored in the memory of the electronic device with which the user interacts, and if the patterns match, the device (200) activates the application associated with the said pattern. When comparing patterns, the error of deviation of the pattern of the user input trajectory is also taken into account. The error allows to take into account deviations of the user input pattern from the reference pattern stored in the device memory (200).

Figure 6:
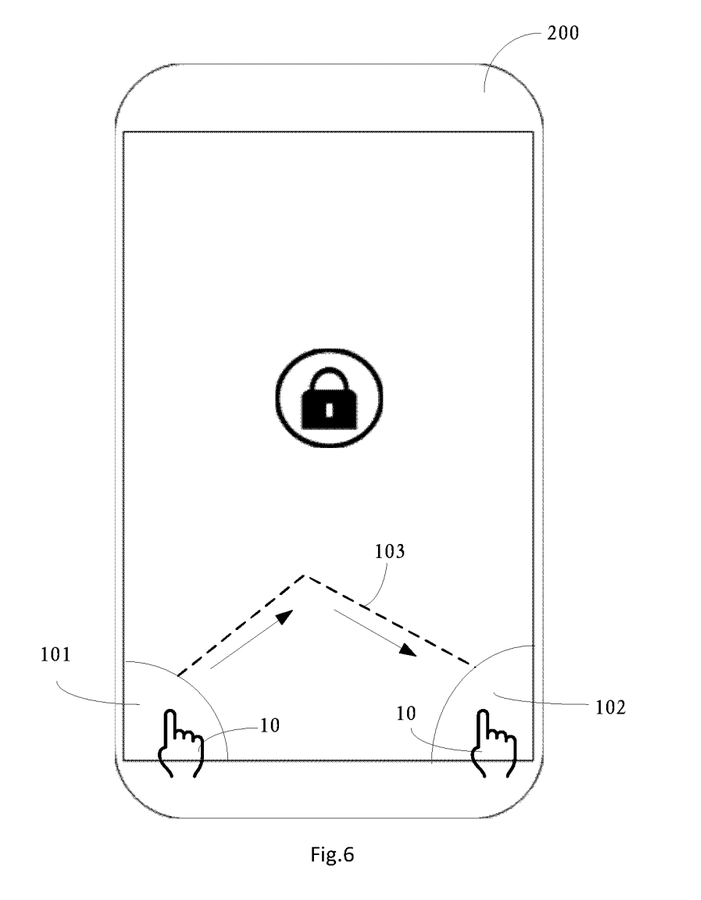
FIG. 6 illustrates an example of a device interface in locked mode.

FIG. 6 presents that the device (200) can also be in locked mode. On the home screen (100) of a smartphone or a personal computer (laptop), for example, the lock sign can be shown, the user can activate the required application associated with the input pattern by interacting with the screen along a path from the corner areas (101, 102) along a given path (103).

Figure 7:
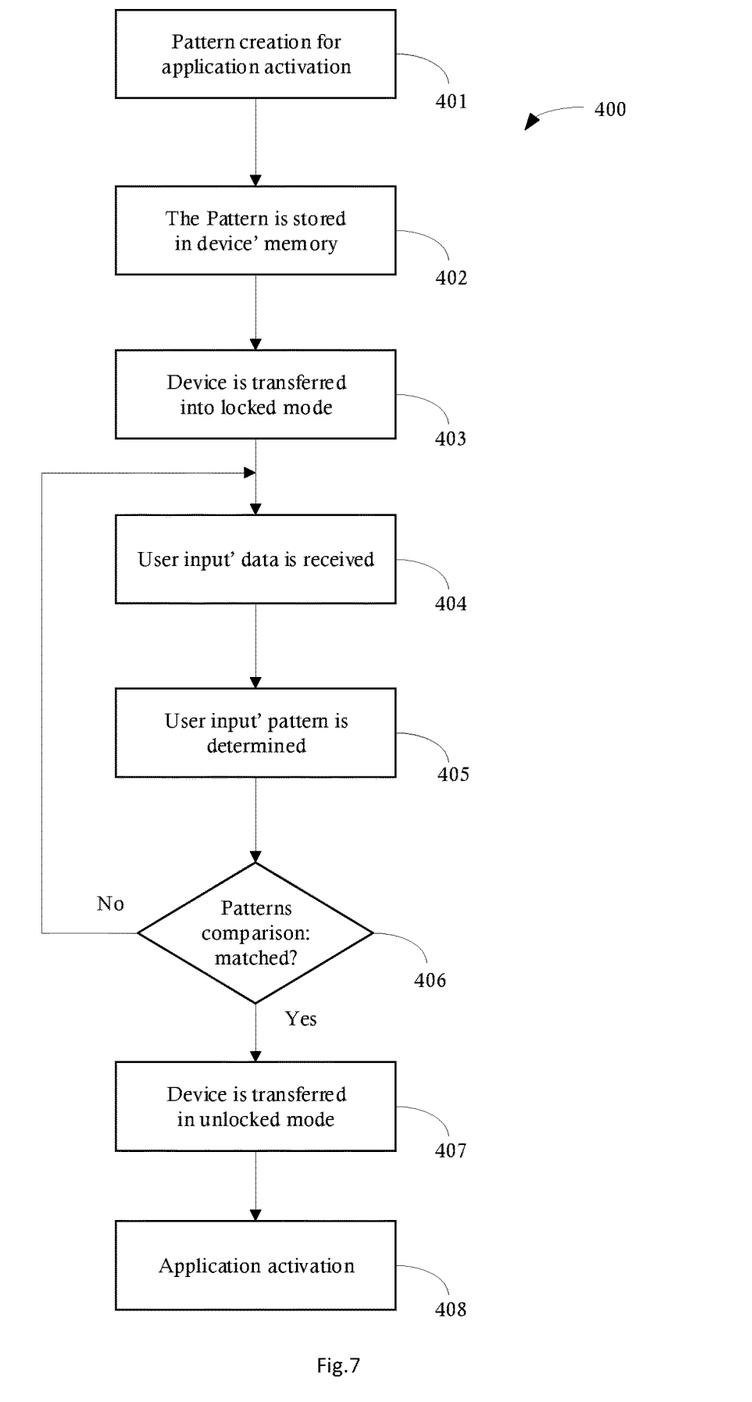
FIG. 7 illustrates the steps of how to call the interface in the locked mode of the device.

FIG. 7 displays the basic steps of the method (400) of activating the application (interface) associated with the pattern of user input when the device is in locked mode. The steps in its general part coincide with the steps of the method (300). After creating a pattern (401) and storing it in the device memory (402), the software part of the device (200) recognizes that the device has entered the locked mode (step 403). After user input recognition (404), the program analyzes the interaction area with the device screen and receives data about the user input pattern (405). Next, a comparison (406) is made between the pattern of user input and pattern, stored in the memory device with the help of software and hardware of the device (200). If the patterns match, the device is unlocked (407) and the application associated with the pattern is activated (408). Otherwise, it may indicate that the gesture has not been performed or that no action has been taken.

When the device is in locked mode (200), it may be with the display turned off. In this case, if the display is touch-enabled (resistive), the user gesture can also be performed when the device display is off. In this case, the application activation method performs all the steps of the above method (400).

FIG. 8 presents an approximate view of the radial interface, which in the preferred variant is activated when user input is recognized according to the claimed method. The interface contains a central area (110) with one or more interface elements (1101).

The interface contains the interface elements (1021)-(1026) associated with the Central element (1101) in the hierarchy tree, located in the auxiliary area of the interface (120). The secondary area (120) is a display area (100) that displays elements for user interaction (1021)-(1026), and allows you to control the selection of elements (1021)-(1026) by scrolling this area (120) in a radial direction clockwise or counterclockwise.

Moving elements (1021)-(1026) is carried out by a virtual elliptical arc (scroll path), which contains the number of elements corresponding to a specific n level of the interface hierarchy.

Interface elements in the present solution are referred to as: software applications, files, folders, functions, devices, actions, directories, etc. Any element of the interface that implements the particular function of the device can be implemented using the declared interface architecture.

The declared solution is also implemented with the help of a system, which is a set of software and hardware consisting of an electronic computing device and software commands stored in its memory, which, when executed, allow to implement the stages of the declared method by calling the application by recognizing the corresponding user input.

The applications presented in these materials disclose only the preferred examples of the implementation of declared claimed solution and the description of the declared technical solution should not be used as limiting other, particular examples of implementation that do not go beyond the scope of the claimed legal protection.

The invention claimed is:

1. A method for activating an application using a screen of an electronic device, the method comprising:
    forming a pattern of a gestural activation on the device screen, wherein said pattern contains a gesture path that contains at least two contact areas on the screen, and each of said areas is located in different corner areas of the screen;
    defining a first area of contact on the screen, wherein said first area of contact contains at least one area located near a first corner of the screen;
    saving in memory of the device information about said pattern;
    determining a contact of a user with said first area of contact on the screen;
    (a)—tracking the contact of the user across the screen to determine an interaction of the user with the screen, wherein said interaction is a curve movement from said first area of contact to a second area of contact, without an interruption of the user contact with the screen during said movement, and wherein the second area of contact contains at least one other area located near a second corner of the screen, the second corner of the screen being different from and adjacent to the first corner of the screen;
    (b)—executing pattern processing by comparing information about the interaction of user with the screen with said saved information about the pattern;
    (c) based on the pattern processing, activating an application on the electronic device for the user when the information about the interaction of the user coincides with the saved information about the pattern; and
    (d) based on the pattern processing, activating a predefined feature of the application for the user when the information about the user interaction coincides with the saved information about the pattern,
    wherein (a)-(d) are performed when the electronic device is in a locked mode and also when the electronic device is in an unlocked mode and also when the screen is on and when the screen is off.

2. The method according to claim 1, wherein during the comparing, a deviation error of the user interaction from the saved pattern in the device memory is determined.

3. The method according to claim 1, wherein the user interaction is carried out using a mouse-type pointing device or a touchscreen display or a touchpad.

4. The method according to claim 3, wherein during the determining of the contact of the user with the first area of contact, a graphic element is formed.

5. The method according to claim 4, wherein a trajectory of movement of the graphic element forms in the user gesture path.

6. The method according to claim 1, wherein upon coincidence of a trajectory of the user interaction and the saved pattern, the device is switched from the locked mode to an unlocked mode.

7. An application activating system for a screen of an electronic device, comprising:
    at least one processor; and
    at least one memory comprising machine-readable instructions, which, when executed by the at least one processor, perform the method according to claim 1.

8. The method according to claim 1, wherein a radial interface is activated based on comparing the information about the user interaction with the saved information about the pattern.

9. The method according to claim 1, wherein
    a radial interface is activated, and
    the radial interface includes:
        a central area having a central element in a hierarchy tree, and
        a secondary area having a plurality of elements scrollable in a radial direction.

10. An electronic device, comprising:
    at least one processor;
    a display screen; and
    at least one memory comprising machine-readable instructions that, when executed by the at least one processor, perform operations comprising:
        having a pattern of a gestural activation for the screen, wherein said pattern contains a gesture path that contains at least two contact areas on the screen, and each of said areas is located in different corner areas of the screen;
        having defined a first area of contact on the screen, wherein said first area of contact contains at least one area located near a first corner of the screen;
        having saved in the at least one memory information about said pattern;
        determining a contact of a user with said first area of contact on the screen;
        (a)—tracking the contact of the user across the screen to determine an interaction of the user with the screen, wherein said interaction is a curve movement from said first area of contact to a second area of contact, without an interruption of the user contact with the screen during said movement, and wherein the second area of contact contains at least one other area located near a second corner of the screen, the second corner of the screen being different from and adjacent to the first corner of the screen;
        (b)—executing pattern processing comparing information about the interaction of user with the screen with said saved information about the pattern;
        (c)—based on the pattern processing, activating an application on the electronic device for the user when the information about the interaction of the user coincides with the saved information about the pattern, in situations when the screen is on and in situations when the screen is off; and
        (d)—based on the pattern processing, activating a predefined feature of the application for the user when the information about the user interaction coincides with the saved information about the pattern,
    wherein (a)-(d) are performed when the electronic device is in a locked mode and also when the electronic device is in an unlocked mode and also when the screen is on and when the screen is off.

11. The device according to claim 10, wherein during the comparing, a deviation error of the user interaction from the saved pattern in the device memory is determined.

12. The device according to claim 10, wherein the user interaction is carried out using a mouse-type pointing device or a touchscreen display or a touchpad.

13. The device according to claim 12, wherein during the determining of the contact of the user with the first area of contact, a graphic element is formed.

14. The device according to claim 13, wherein a trajectory of movement of the graphic element forms in the user gesture path.

15. The device according to claim 10, wherein the device is in a locked mode when the contact is determined, and
wherein upon coincidence of a trajectory of the user interaction and the saved pattern, the device is switched from the locked mode to an unlocked mode.

16. A non-transitory computer readable storage medium storing instructions that, when executed by at least one processor of an electronic device, perform operations comprising:
having a pattern of a gestural activation for a screen of the device, wherein said pattern contains a gesture path that contains at least two contact areas on the screen, and each of said areas is located in different corner areas of the screen;
having defined a first area of contact on the screen, wherein said first area of contact contains at least one area located near a first corner of the screen;
having saved in at least one memory of the device information about said pattern;
determining a contact of a user with said first area of contact on the screen;
(a)—tracking the contact of the user across the screen to determine an interaction of the user with the screen, wherein said interaction is a curve movement from said first area of contact to a second area of contact, without an interruption of the user contact with the screen during said movement, and wherein the second area of contact contains at least one other area located near a second corner of the screen, the second corner of the screen being different from and adjacent to the first corner of the screen;
(b)—executing pattern processing by comparing information about the interaction of user with the screen with said saved information about the pattern;
(c)—based on the pattern processing, activating an application on the electronic device for the user when the information about the interaction of the user coincides with the saved information about the pattern, in situations when the screen is on and in situations when the screen is off; and
(d)—based on the pattern processing, activating a predefined feature of the application for the user when the information about the user interaction coincides with the saved information about the pattern,
wherein (a)-(d) are performed when the electronic device is in a locked mode and also when the electronic device is in an unlocked mode and also when the screen is on and when the screen is off.

17. The non-transitory computer readable storage medium of claim 16, wherein
during the determining of the contact of the user with the first area of contact, a graphic element is formed, and
a trajectory of movement of the graphic element forms in the user gesture path.

18. The non-transitory computer readable storage medium of claim 16, wherein
the device is in a locked mode and the display is off when the contact is determined, and
upon coincidence of a trajectory of the user interaction and the saved pattern, the device is switched from the locked mode to an unlocked mode.

* * * * *